INVENTOR.
WILLYS W. McCLOUD
BY
ATTORNEY

United States Patent Office 3,105,236
Patented Sept. 24, 1963

3,105,236
DUPLEX TRANSMIT-RECEIVE ANTENNA SYSTEM EMPLOYING A DIPOLE AND A LOOP
Willys W. McCloud, Pacific Palisades, Calif., assignor to Douglas Aircraft Company, Inc., Santa Monica, Calif.
Filed Mar. 17, 1960, Ser. No. 15,708
3 Claims. (Cl. 343—180)

This invention relates to radio-type co-operative collision-warning systems for aircraft and is particularly concerned with the transmitting and receiving antennas of such systems.

Such systems require that, on each craft, both antennas shall be operating continuously and therefore interference between the transmitting and receiving antennas on any given aircraft has necessitated that the receiving and transmitting antennas be made responsive to signals lying in substantially entirely different frequency bands. Since Federal restrictions have, recently, seriously restricted transmitting frequency band-ranges permissible, this problem has obviously become acute.

This invention however, provides an arrangement, and other characteristics, of an interference-nullifying dual nature transmitting and receiving antenna for use with a cooperative-type aircraft collision warning system such as to enable both the transmitting antenna and the receiving antenna in the airplane to operate contemporaneously and continuously on one and the same frequency without the slightest interference between the signals received or those transmitted, in the one aircraft.

Briefly, to this and other ends, the present transmitting antenna takes the form and characteristics of a dipole, while the receiving antenna is embodied as a rotative loop. Further, the dipole is arranged substantially along a diameter or on the geometrical centerline or centrally of the "loop," that is substantially concentrically therewith. Moreover, both the loop and the dipole lie in one and the same plane, preferably the vertical plane, even when the loop is rotating.

As a consequence, all possible antenna-intercoupling paths are reduced to such an extent that the signals emitted from the dipole are excluded from the loop antenna and vice versa. A reason for this phenomenon is that the capacitative and inductive fields of both antennas are totally balanced out against each other. A further reason for this occurrence is the fact that the capacitative effect of both antennas with respect to the adjacent metallic fuselage of the aircraft is also balanced out by this concentric, co-planar arrangement of antennas.

Stated another way, the invention provides, by this arrangement, novel boundaries constituted by the novel arrangement of the metallic and insulative components of the system, which boundaries are so defined as to support the electric and magnetic fields in such a manner as to enhance the necessary mutual electrical isolation of signals from each of the two antennas.

The now-preferred embodiment of these, and other, concepts is representationally depicted in the accompanying drawings, but only by way of example. In these drawings.

Figure 1:
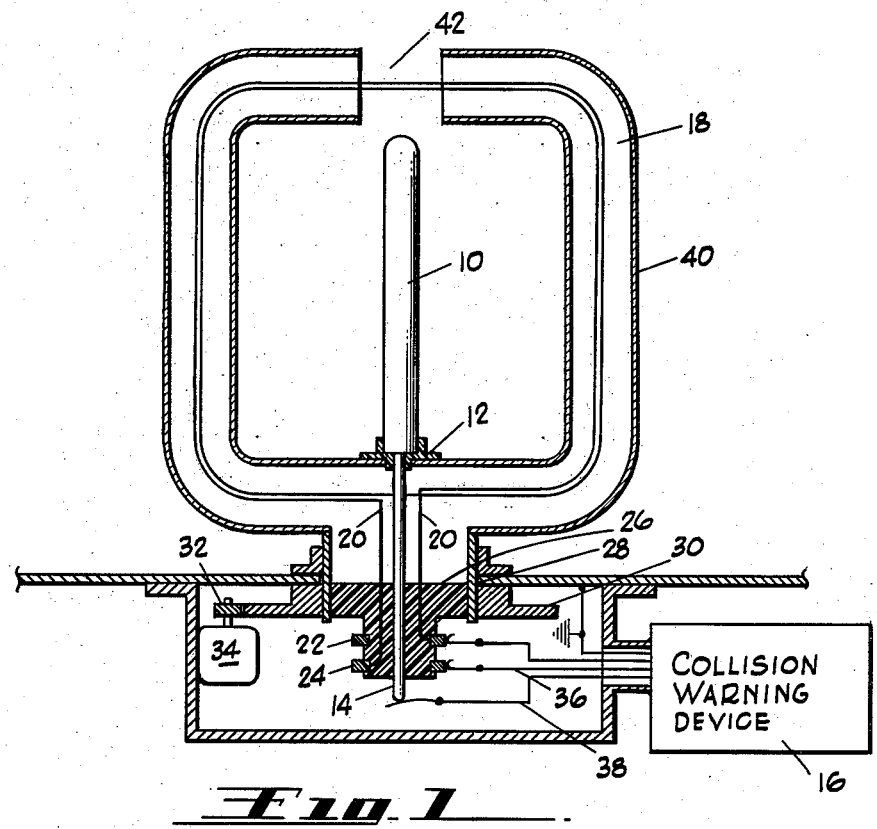
FIG. 1 is a diagrammatic elevational view of the system.
Figure 2:
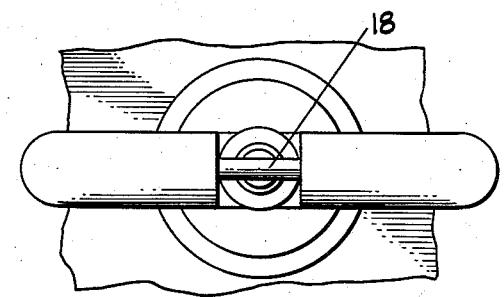
FIG. 2 is a top plan view of the two grouped antennas.

As illustrated, the system comprises a dual-antenna including a dipole transmitting antenna 10 of substantially conventional configuration and electrically connected at its terminal 12 by a shielded conductor path 14 to the transmitting portion within the radio-type cooperative collision warning device housing 16. The invention also encompasses a receiving antenna 18 arranged in a novel manner with respect to the transmitting antenna.

The warning receiving antenna takes the form of a rotary signal receiving loop 18, here illustrated as a hollow rectangular insulated container containing multiple turns, the ends of which are connected by wires 20 to slip rings 22, 24. The slip rings are mounted on a stub shaft 26 of insulating material mounted for rotation at 28 in a portion of the fuselage. The stub shaft carries a ring gear 30 driven by pinion 32 carried on the shaft of electric motor 34 providing for rotation of the loop at the desired speed. Conductors 36, 38 contact the slip rings and lead to the receiving portion within the housing 16. Loop 18 is enclosed, as shown, by a hollow metallic tube 40. The loop 18 is "shielded" by the metallic tube 40 surrounding same but having a gap 42 at the top, as is conventional with receiving antenna shielded loops. The loop and shield are, of course, carried for rotation by the stub shaft 26.

It is to be definitely understood (1) that 10 is substantially concentric with 18, that is, 10 is centered longitudinally within 18 and so as to occupy the transverse center of the rectangular loop. No part of the dipole per se lies outside loop 18, its conductors, only, lying outside said loop. Thus the entirety of the dipole per se, or its radiating surface, is strictly confined within the perimeter of the loop. No radiating portion of 10 extends outside loop 18; and (2) that 10 and 18 lie in one and the same vertical plane even when the loop is rotating.

Conductor paths 20, 36, 38 are shielded as is conductor path 14 and terminals 12 and 20 are so designed and located mutually, in the conventional manner, that they are interbalanced electrically, as will be understood by those working in this art. The dipole moment of the loop is reduced to the minimum.

It will further be apparent to one skilled in this art that the aforedescribed arrangement and configuration of the dual antenna, of its terminals and of its dipole mount reduce possible intercoupling paths to such an extent that the loop will fail to detect or pick up signals from the associated dipole, even though both antennas are working at exactly the same frequency. This characteristic follows from the fact that the present arrangement of antennas balances out and nullifies the capacitative and inductive fields of both the dipole and the loop, in accordance with the well-established principle that the balanced loop, having effective directional pick-up characteristics, and with a sharply defined "null," substantially eliminates dipole currents induced therein, these currents flowing in the same direction in each leg of the loop. The basic "insensitivity" of such a loop herein enhances the utilizability of transmitting dipole and the receiving loop on the same frequency, always providing that this dipole is concentric, and co-planar with the loop.

The advances are further enhanced by the fact that said arrangement also balances out the capacitative effect on the loop and dipole of the adjacent metallic fuselage, as will be perceived by those skilled in this art.

More specifically, by the aforesaid arrangement, etc., novel boundaries are provided for both the metallic and the insulative members of the antenna system, thereby to create and support such electric and magnetic fields around the antennas as can effectuate complete isolation of the dipole signals from the loop received signals, despite the fact that one and the same frequency is simultaneously employed for both antennas.

The respective antenna patterns of the two antennas have been found to be substantially conventional and are therefore neither illustrated or described.

Although certain specific terms of art have been employed, in order to render this disclosure more concrete, they in no wise constitute the invention itself. As a matter of fact and of law, the invention itself is as defined in the sub-joined claims.

I claim:
1. In combination with an aircraft, a transmit-receive antenna system comprising:
   a loop antenna, said antenna being mounted for rotation relative to and disposed to extend from an exterior surface of the aircraft;
   a shielding structure surrounding said loop antenna, said shielding structure having a gap therein disposed substantially on an axis of rotation of said loop antenna;
   means for coupling said loop antenna to a receiving instrumentality;
   a dipole antenna positioned on said axis of rotation of said loop antenna and located entirely within the confines of said loop antenna, said loop antenna and said dipole antenna lying in a common plane normal to said surface of said aircraft; and
   means for coupling said dipole antenna to a signal transmitting instrumentality, said location of said dipole antenna within the confines of said loop antenna and in relation to said gap permitting simultaneous transmit-receive functions on a common frequency with a minimum of intercoupling between said loop and said dipole antennae.

2. An antenna system according to claim 1 wherein said loop antenna has substantially a square configuration.

3. An antenna system according to claim 1 wherein said coupling means for said loop antenna comprises slip rings, said coupling means for said dipole antenna being entirely independent from said loop antenna coupling means.

References Cited in the file of this patent
UNITED STATES PATENTS

| | | |
|---|---|---|
| 1,496,155 | Fransson | June 3, 1924 |
| 1,589,344 | Akers | June 22, 1926 |